(12) United States Patent
Liang et al.

(10) Patent No.: US 11,140,550 B2
(45) Date of Patent: Oct. 5, 2021

(54) GATEWAY, A CMS, A SYSTEM AND METHODS THEREIN, FOR ASSISTING A SERVER WITH COLLECTING DATA FROM A CAPILLARY DEVICE

(71) Applicant: Telefonaktiebolaget LM Ericsson (publ), Stockholm (SE)

(72) Inventors: Hongxin Liang, Upplands Väsby (SE); Elena Fersman, Stockholm (SE); Rafia Inam, Västerås (SE); Athanasios Karapantelakis, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 201 days.

(21) Appl. No.: 16/327,634

(22) PCT Filed: Aug. 25, 2016

(86) PCT No.: PCT/EP2016/070117
§ 371 (c)(1),
(2) Date: Feb. 22, 2019

(87) PCT Pub. No.: WO2018/036633
PCT Pub. Date: Mar. 1, 2018

(65) Prior Publication Data
US 2019/0182212 A1    Jun. 13, 2019

(51) Int. Cl.
*H04W 40/12*    (2009.01)
*H04W 40/24*    (2009.01)
(Continued)

(52) U.S. Cl.
CPC .......... *H04W 12/06* (2013.01); *H04L 9/0866* (2013.01); *H04L 63/029* (2013.01);
(Continued)

(58) Field of Classification Search
None
See application file for complete search history.

(56) References Cited

U.S. PATENT DOCUMENTS 8,909,556 B2 * 12/2014 Huxham ............ G06Q 20/3226
705/64
10,764,813 B2 * 9/2020 Stauffer ................ H04W 36/18
(Continued)

FOREIGN PATENT DOCUMENTS

EP       2 955 940 A1    12/2015
WO    2012135680 A1    10/2012

OTHER PUBLICATIONS

Smart e-Health Gateway: Bringing Intelligence to Internet-of-Things Based Ubiquitous Healthcare Systems. Rahmani. IEEE. (Year: 2015).*

(Continued)

*Primary Examiner* — Venkat Perungavoor
(74) *Attorney, Agent, or Firm* — Rothwell, Figg, Ernst & Manbeck, P.C.

(57) ABSTRACT

A gateway, a Connectivity Management System (CMS), a system and methods therein for assisting a server with collecting data from a capillary device are provided. The gateway collects the data from the capillary device; and transmits the data to the server via the CMS. The data is transmitted in a tunnel from the gateway to the CMS, wherein the tunnel is created according to a connectivity parameter associated to a key of the capillary device stored in the CMS.

24 Claims, 9 Drawing Sheets

(51) Int. Cl.

| | | |
|---|---|---|
| *H04W 12/06* | (2021.01) | |
| *H04L 29/06* | (2006.01) | |
| *H04W 12/03* | (2021.01) | |
| *H04W 12/041* | (2021.01) | |
| *H04L 9/08* | (2006.01) | |
| *H04W 48/08* | (2009.01) | |
| *H04W 4/70* | (2018.01) | |
| *H04W 88/16* | (2009.01) | |

(52) U.S. Cl.
CPC ...... *H04L 63/0272* (2013.01); *H04L 63/0428* (2013.01); *H04L 63/062* (2013.01); *H04L 63/08* (2013.01); *H04L 63/0876* (2013.01); *H04W 12/03* (2021.01); *H04W 12/041* (2021.01); *H04W 4/70* (2018.02); *H04W 88/16* (2013.01)

(56) References Cited

U.S. PATENT DOCUMENTS

| | | | | |
|---|---|---|---|---|
| 11,006,467 | B2 * | 5/2021 | Hong | H04W 48/18 |
| 2009/0058635 | A1 * | 3/2009 | LaLonde | G16H 40/67 |
| | | | | 340/539.11 |
| 2009/0227234 | A1 * | 9/2009 | Bosch | H04W 12/069 |
| | | | | 455/411 |
| 2009/0286509 | A1 * | 11/2009 | Huber | H04M 15/73 |
| | | | | 455/410 |
| 2010/0041364 | A1 * | 2/2010 | Lott | H04W 12/08 |
| | | | | 455/404.1 |
| 2010/0128677 | A1 * | 5/2010 | Liu | H04L 47/12 |
| | | | | 370/328 |
| 2012/0159167 | A1 | 6/2012 | Lee et al. | |
| 2015/0312255 | A1 * | 10/2015 | Libonate | H04L 63/0876 |
| | | | | 713/168 |
| 2016/0057585 | A1 * | 2/2016 | Horn | H04L 12/189 |
| | | | | 370/312 |
| 2017/0171782 | A1 * | 6/2017 | Mohamed | H04W 36/385 |
| 2019/0097794 | A1 * | 3/2019 | Nix | H04L 9/085 |
| 2019/0268313 | A1 * | 8/2019 | Revell | H04W 12/04 |
| 2019/0268882 | A1 * | 8/2019 | Baghel | H04W 72/04 |
| 2019/0387429 | A1 * | 12/2019 | Basu Mallick | H04W 40/04 |

OTHER PUBLICATIONS

Internet of Things: A Survey on Enabling Technologies, Protocols, and Applications. Al-Fuqaha. IEEE. (Year: 2015).*

Investigating the role of mobile network operators as platform providers in the internet of things> Karapantelakis. ECONSTOR. (Year: 2015).*

International Search Report and Written Opinion issued in International Application No. PCT/EP2016/070117, dated Nov. 21, 2016, 11 pages.

* cited by examiner

GATEWAY, A CMS, A SYSTEM AND METHODS THEREIN, FOR ASSISTING A SERVER WITH COLLECTING DATA FROM A CAPILLARY DEVICE

CROSS REFERENCE TO RELATED APPLICATION(S)

This application is a 35 U.S.C. § 371 National Stage of International Patent Application No. PCT/EP2016/070117, filed Aug. 25, 2016, designating the United States.

TECHNICAL FIELD

Embodiments herein relate to a gateway, a Connectivity Management System (CMS), a system and methods therein. In particular, they relate to assisting a server with collecting data from a capillary device.

BACKGROUND

A wireless communication network refers to any type of network that establishes connections without cables. Wireless communications use ElectroMagnetic (EM) waves that travel through the air. There are three main categories of wireless communication, based on how far the signal travels. In short-range wireless communication, the signal travels from a few centimeters to several meters. Examples of short-range wireless communication technologies are Bluetooth, Bluetooth Low Energy (Bluetooth LE), 6LowPAN, infrared, near field communication, ultraband and Zigbee. In medium-range wireless communication, the signal travels up to 100 meters or so. Most widely used medium-range wireless communication technologies include Wi-Fi and Hotspots. In wide-area wireless communication, the signal travels quite far, from several kilometers to several thousand kilometers. Examples of wide-area wireless communication technologies are cellular, WiMAX and satellite. Cellular communication technology includes a LTE, a WCDMA, a GSM, any 3GPP cellular, or any cellular technologies.

In current state-of-the-art, there is a type of device considered as a capillary device. For accessing Internet, the capillary device first connects to a gateway, using low power, short-range wireless communication technologies. Then the gateway connects to the Internet using either a wired communication technology or wireless communication technology, such as a medium-range or wide-area wireless communication technology. This is because the capillary device does not have a capability to connect to the Internet, owing to, e.g., it does not have the above wired or wireless communication module, e.g. in order to meet e.g. battery constraints, or a requirement of manufacturing form, or cost.

An example of the capillary device is a wearable device, which is also referred to as wearable communication device, or electronic wearable portable device. The term wearable device refers to electronic technologies or computers that are incorporated into items of clothing and accessories, which can be worn on the body of a user to collect data. Generally, the wearable device has some form of communications capability and will allow a server and the wearer access to collect the data.

In one particular implementation, the gateway may be a mobile phone, and the capillary device may be a wearable device connecting to the mobile phone via Bluetooth LE. An application software running on the mobile phone is responsible for collecting data from the capillary device, applying necessary computation, and propagating the data to a cloud server using the wide-area wireless communication technology. The server may give a corresponding feedback based on the data collected by the wearable device.

When the data is transmitted to the server by the mobile phone, the data is treated as any regular broadband traffic, such as audio, video, web browsing, in the same manner, which e.g. may lead to latency for the data to reach the server.

SUMMARY

It is therefore an object of embodiments herein to improve the way of integrating communications networks such as a cellular networks and a WLAN.

According to a first aspect of embodiments herein, the object is achieved by a method performed in a gateway for assisting a server with collecting data from a capillary device. The gateway collects the data from the capillary device; and transmits the data to the server via a Connectivity Management System, CMS. The data is transmitted in a tunnel from the gateway to the CMS, wherein the tunnel is created according to a connectivity parameter associated to a key of the capillary device and stored in the CMS.

According to a second aspect of embodiments herein, the object is achieved by a gateway for assisting a server with collecting data from a capillary device. The gateway is configured to collect the data from the capillary device; and transmit the data to the server via a CMS. The data is transmitted in a tunnel from the gateway to the CMS, wherein the tunnel is created according to a connectivity parameter associated to a key of the capillary device and stored in the CMS.

According to a third aspect of embodiments herein, the object is achieved by a method performed in a CMS for assisting a server with collecting data from a capillary device. The CMS receives the data from a gateway via a tunnel which is from the gateway to the CMS, wherein the tunnel is created according to a connectivity parameter associated to a key of the capillary device and stored in the CMS. The CMS forwards the data to the server.

According to a fourth aspect of embodiments herein, the object is achieved by a CMS for assisting a server with collecting data from a capillary device. The CMS is configured to receive the data from a gateway via a tunnel which is from the gateway to the CMS, wherein the tunnel is created according to a connectivity parameter associated to a key of the capillary device and stored in the CMS. The CMS is also configured to forward the data to the server.

According to a fifth aspect of embodiments herein, the object is achieved by a system for assisting a server with collecting data from a capillary device, comprising the CMS according to the fourth aspect.

The connection between the capillary device and the sever is managed by introducing the CMS, particularly via the connectivity parameter stored in the CMS. Thanks to the key, it is enabled to identify the data collected from the capillary device, thereby it is enabled to handle the data differently by implementing different connectivity parameters. Additionally, by introducing the tunnel, data security and privacy are guaranteed at network level, particularly when the tunnel is encrypted.

BRIEF DESCRIPTION OF THE DRAWINGS

Examples of embodiments herein are described in more detail with reference to attached drawings in which.

DETAILED DESCRIPTION

Figure 1:
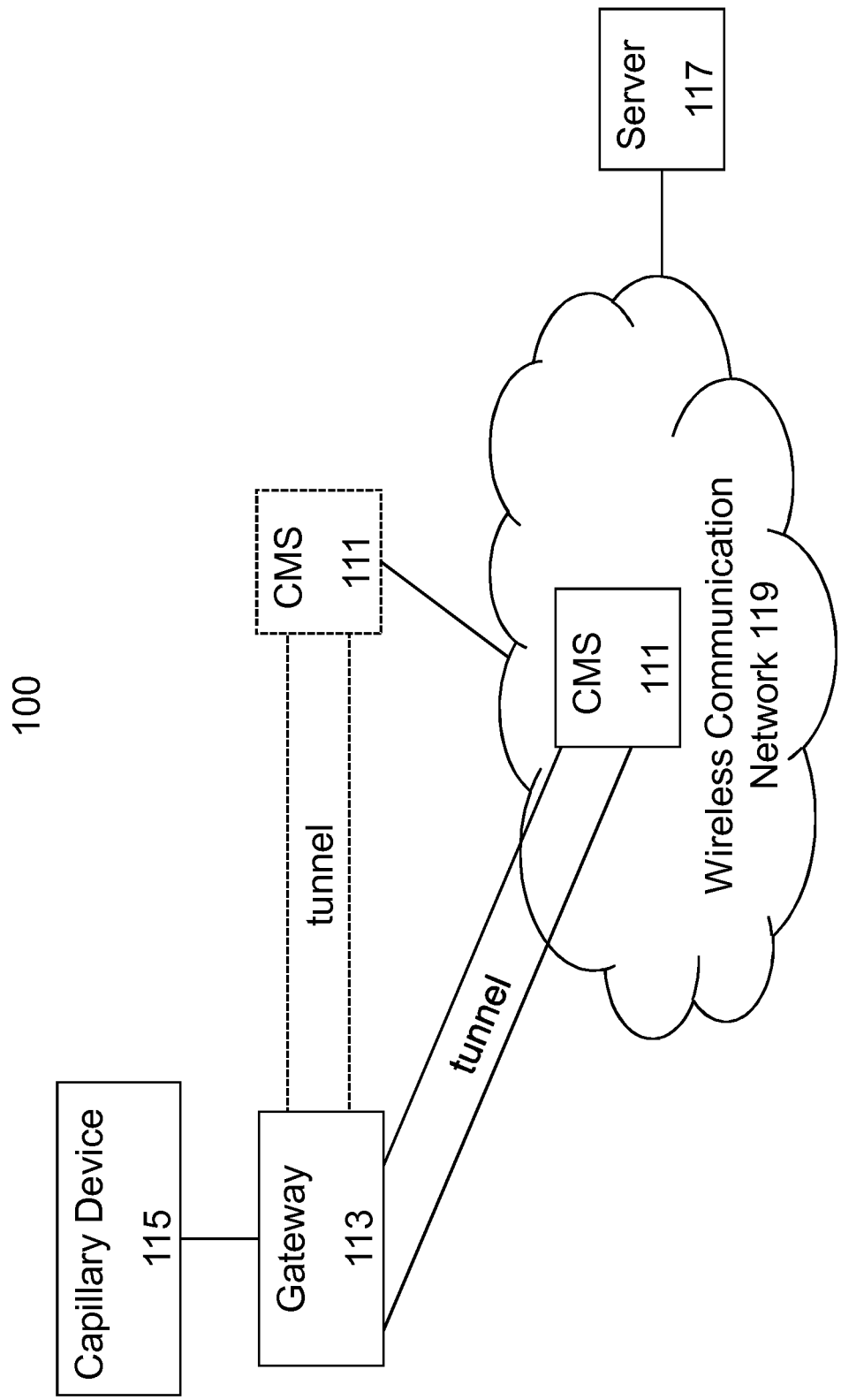
FIG. 1 is a schematic block diagram illustrating embodiments of a communication network.

As part of developing embodiments herein, a problem will first be identified and shortly discussed.

The conventional way to collect data from a capillary device for a server has a general problem that connectivity between a capillary device and its associated server is unmanaged. This problem can be further broken down into several issues such as e.g.:

First, security and privacy are not guaranteed. For example, for certain types of confidential services, data would be needed to be encrypted and/or tunnelled. Current state of the art can only guarantee security at an application level, i.e. security setting is configured by the application vendor. The problems of application level security are multiple: First, processing overhead is required at the gateway; second, application level security does not work when a malicious user compromises the network connection. Additional lack of security issues include missing of firewall rules, e.g., blocking a port, blacklists, e.g., blocking "malicious" devices from transmitting data or whitelists, e.g., devices that are allowed to transmit data.

Second, the server may not timely give a feedback to the user of the capillary device due to a limited number of the servers. Normally, the servers are owned or rented by a service provider (SP) who sells the capillary device. Due to a cost consideration, the number of the servers may be very small. For certain types of services requiring low-latency, in order to have the server process the collected data and provide feedback to the user of the capillary device as quickly as possible, the server needs to be distributed globally as close to the capillary devices as possible. This dramatically increases the cost of the SP.

Third, network level Quality of Service (QoS) cannot be applied. From the gateway to the server, the data has to be transferred through the cellular network. Since the collected data is not differentiated from other traffic, e.g., audio, video, web browsing, it is therefore not possible to apply QoS.

Fourth, data may not be timely collected from the gateway owing to that the gateway cannot access the wireless communication network, particularly when the gateway is a mobile gateway roaming abroad and the cellular data thereof is turned off. This also leads to the second problem mentioned above, where a feedback may not be timely given by the server to the user of the capillary device. Since the data is not treated differently from other traffic, and the user of the gateway, that may be a mobile phone, has to pay as for the other data traffic. In case of roaming, the user usually turns off the cellular data of the gateway completely to avoid a high roaming cost, and consequently, the gateway would not have any chance to upload the data to the server. As a result, the user cannot get any feedback in a timely manner caused by the fact that the gateway cannot timely upload the data to the server. For certain type of services such as relating to health, if the user cannot get the feedback in time, it can be critical for the health of the user, e.g. a capillary device checking sugar-level for a diabetes patient.

An object of embodiments herein is to provide better ways to assist a server to collect data from a capillary device.

Embodiments herein provide a CMS for managing connectivity of the capillary devices over a wireless communication network, using the gateway as a proxy. In this manner, the gateway does not simply act as a relay, but also acts according to a connectivity parameter stored in the CMS, for communication of every capillary device, or capillary device group, with its respective server.

In addition to that, some embodiments comprise a tunnel between the CMS and the gateway. A Key identifying capillary device is also provided, to identify the data collected from the respective capillary device and to implement different connectivity parameters for different capillary devices.

FIG. 1 depicts an example of a communications network 100 in which embodiments herein may be implemented. The communications network 100 comprises a CMS 111, a gateway 113, a capillary device 115, a server 117 and a wireless communication network 119.

The wireless communication network 119 may also be referred to as a radio network, or a cellular network. The wireless communication network 119 may comprise a Radio Access Network (RAN) and a Core Network (CN). The radio access network connects the gateway 113 with the CN. The wireless communication network 119 may use a number of different radio access technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

CMS 111

According to embodiments herein, the CMS 111 is either located within or out of the wireless communication network 119. The CMS 111 is provided for assisting in data collection from the capillary device 115. Specifically, the CMS 111 receives data from the gateway 113 who have collected the data from the capillary device 115, and forwards the data to the server 117.

The CMS 111 may offer differentiated connectivity tailored to meet the needs of different devices such as the capillary device 115 and different types of users using the devices. The CMS 111 may be used to manage connectivity, e.g., IP connectivity, over private networks, as well as over the Internet, which is tailored to meet a requirement of a server such as the server 117 or a capillary device such as the capillary device 115. The CMS 111 may also comprise capabilities to create and enforce tailored connectivity between the capillary device 115 and the sever 117 according to a connectivity parameter, such as QoS. The CMS 111 may further comprise capabilities to handle a data transmission according to a connectivity parameter. The CMS 111 comprises at least one connectivity management device.

The CMS 111 is responsible for managing connectivity between the capillary device 115 and the server 117 which is associated to the capillary device 115 and which server 117 may belong to a service provider (SP).

The CMS 111 configures the connectivity between the capillary device 115 and the server 117 into the wireless communication network 119. The connectivity is reflected by the connectivity parameter. Hence, configuring the connectivity means configuring the connectivity parameter. The connectivity parameter will be further described below.

Gateway 113

In some embodiments, the gateway 113 may be an electronic device equipped with short-range radio communication module, configured to communicate with the capillary device 115 using the short-range wireless communication technology. The gateway 113 in these embodiments is capable of downloading and installing an application software which is normally issued by the manufacture of the capillary device 115. Using the application software which has been installed in the gateway 113, the capillary device 115 communicates with the gateway 113, including, e.g., establishing connection, paring, and uploading a key or data. As an example, application software may be a mobile application.

In some embodiments, the gateway 113 may be an electronic device also equipped with a wired communication or a medium-range or wide-area communication module, configured to communicate with the server 117 using the wired communication technology or medium-range or wide-area communication technology.

The gateway 113 may either be in a mobile or immobile form. A mobile gateway may, e.g. be a user equipment, a mobile terminal or a wireless terminal, a mobile phone, a computer, e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user. An immobile gateway may, e.g. be a fixed device deployed in the field, e.g. for agriculture usage, or a fixed device deployed in, e.g., an office or forest for collecting data relating to, e.g. air quality, noise level, temperature from sensors being the capillary devices.

Capillary Device 115

The capillary device 115 is an electronic device equipped with short-range wireless communication technology module, configured to communicate with the gateway 113 using the short-range wireless communication technology. The capillary device 115 may comprise a sensor, such as a temperature sensor, which may be distributed in a forest to collect temperature information for the server 117. The capillary device 115 may e.g. comprise one or more out of: a speedometer, a Global Positioning System (GPS) and an engine performance monitor, equipped in a vehicle, e.g. car, truck or bus. The capillary device 115 may further comprise one or more out of: a blood pressure monitor, a heartbeat monitor, an air quality sensor and an activity tracker, e.g. wearable device. Examples of wearable devices e.g. include watches, wristbands, glasses, contact lenses, e-textiles and smart fabrics, headbands, beanies and caps, jewellery such as rings, bracelets, and hearing aid-like devices that are designed to look like earrings.

Capillary devices having the same key form a capillary device group, also referred to as a device group. The capillary device 115 according to embodiments herein may relate to one capillary device or a group of capillary devices.

Server 117

There are one or more servers such as one or more servers 117 (only one is depicted in FIG. 1) that are configured to collect data from the capillary device 115. The server 117 may be configured to collect data from the capillary devices 115. The server 117 may further be configured to give a feedback to the capillary devices 115, in order to control and/or actuate the capillary devices 115. The one or more servers 117 may belong to one or more service providers (SPs). As an example, FIG. 4b and FIG. 4c, which will be described below, show that the server 117-1 belongs to SP1, and the server 117-2 belongs to SP2. An example of the server 117 may be a device managing a fleet of trucks or buses, or a forest fire operations centre receiving information from temperature sensors spread in a forest, or a device collecting health information or activity information from a user.

It is worth noting that FIG. 1 illustrates logical entities, and in reality many of these entities may be co-located. For example, the CMS 111 may be part of the wireless communication network 119, or it may be a separate entity out of the wireless communication network 119, e.g. functioning as a cloud service, and interfacing to an operator node in the wireless communication network 119 through an application programming interface (API). The same holds true for the server 117 of the service provider, which also may be part of or interface to an operator node. The operator node may e.g. be a radio base station, for example an eNB, an eNodeB, or an Home Node B, an Home eNode B or any other network node capable to serve a user equipment or a machine type communication device in a cellular radio network.

Example of embodiments of a method performed by a gateway 113 for assisting a server 117 with collecting data from a capillary device 115 will now be described with reference to FIG. 2.

The method may comprise the following actions, which actions may be taken in any suitable order. Actions that are optional are presented in dashed boxes in FIG. 2.

Action 201

To facilitate the following actions at a later stage of the method, the gateway 115 may obtain a key from the capillary device 115.

According to embodiments herein, the key is used to identify the capillary device 115. The CMS 111 may generate and assign one key for one capillary device 115 or for a plurality of capillary devices 115. The CMS 111 may assign the key upon a key request from the server 117. The key request may order a key for a specific capillary device 115. Alternatively, the key request may order a bulk of keys at once for a plurality of capillary devices 115. One key may be uploaded, e.g. by the server 117, or some tools used by the SP, to one capillary device 115. After the capillary device 115 has paired with the gateway 113, it uploads the key to the application software of the gateway 113. The gateway 113 therefore obtains the key from the capillary device 115, in order to trigger the creation the tunnel with respect to the key. Additionally, the data collected from the capillary device 115 may also be encrypted with the key by the capillary device 115.

According to embodiments herein, the key may be generated by the CMS 111 based on any one out of: a pair of public and private keys, an Integrated Circuit Card Identifier (ICCID), an International Mobile Subscriber Identity (IMSI), and an International Mobile Equipment Identity (IMEI).

Action 202

In order to guarantee that only an authorized capillary device such as the capillary device 115 can use the tunnel, the method may further comprise validating the key prior to creating the tunnel. The gateway 113 may communicate with the CMS 111 via a secured communication channel to validate the key. This action may be done similarly as validating, a SIM card, and in this process serial_id SID1 may be involved, more details will be provided below. The validation request to validate the key may comprise a (key, serial_id) pair, or additionally with a device category and manufacturer. The serial_id is a device ID, also referred to as hardware serial number, of the capillary device 115. Examples of the serial_id may be a media access control (MAC) address of the capillary device 115, or a manufacture serial number generated by a manufacturer or the SP for identifying each device it manufactures. A generation logic or algorithm for the manufacture serial number is up to the manufacturer or SP to decide.

Thus, according to some embodiments herein, the gateway 113 sends a request to the CMS 111 to validate the key.

Action 203

The gateway 113 may then receive an acknowledgement from the CMS 111 when the key is validated. After a successful validation, the gateway 113 may trigger the creation of the tunnel towards the CMS 111.

The gateway 113 may then receive an error from the CMS 111 when the key is not validated, in this case no tunnel will be created.

Action 204

The gateway 113 may then trigger the CMS 111 to create a tunnel according to a connectivity parameter associated to the key. According to embodiments herein, the connectivity parameter may be stored in the CMS 111. The tunnel may be encrypted with the key between the gateway 113 and the CMS 111.

The connectivity parameter may comprise parameters relating to one or more of: Open System Interconnection (OSI) layer, i.e. an Application layer, Presentation layer, Session layer, Transport layer, Network layer, Data Link layer and physical layer, e.g., wired, wireless, parameters.

According to embodiments herein, the connectivity parameter may, e.g. comprise a Quality of Service (QoS) parameter. The QoS may comprise a priority on tunnel for data transmission related to a certain capillary device or a capillary device group. The QoS parameter may be determined according to a contract with a service provider having the server 117. The QoS parameter is associated with the tunnel. Data transmission in one tunnel, enjoy the same QoS parameter and may be treated with higher priority as compared to other traffic. Additionally, since connectivity may be managed per capillary device group 115, different priorities may be assigned. As an example, one capillary device 115 related to a service provider may use one QoS "high priority" tunnel, and another capillary device 115 related to another service provider can use a lower priority tunnel.

In addition to the QoS parameter, the connectivity parameter may further comprise at least one of: a firewall rule, a whitelist and a blacklist. An advantage of having additional connectivity parameters is that the data security is further improved, and SP doesn't have to handle the security issues itself.

After creating the tunnel towards the CMS 111, all further communication will be done via this tunnel. Technology used to create the tunnel may, e.g. be a virtual private network (VPN), virtual local area network (VLAN), GPRS Tunnelling Protocol (GTP).

The gateway 113 may trigger the CMS 111 to create the tunnel only when no tunnel exists with respect to this key. The tunnel is created per key, not per device, i.e. the tunnel is key specific. The capillary devices 115 having the same key in one capillary device group may use the same tunnel. Therefore Action 204 is not necessarily performed for each capillary device 115, it may be performed for each capillary device group.

The gateway 113 may trigger the CMS 111 to create the tunnel only at an initiating stage. Action 204 is not necessary to performed every time transmitting the data. One possible implementation form is that Action 204 is only performed once, and then the tunnel may be maintained all the time for upcoming data transmission from one capillary device 115 or one capillary device group. Another possible implementation form is that Action 204 is performed for every data transmission session. In this case, the created tunnel may not be maintained all the time, but just when data transmission is needed. For instance, the gateway 113 may trigger the CMS 111 to remove the tunnel per lifetime of a data transmission session.

Action 205

When the capillary device 115 is connected with the gateway 113, the gateway 113 collects the data from the capillary device 115, e.g. by using an application software.

The capillary device 115 may for example connect with the gateway 113 via an application software which has been installed in the gateway 113. The application software is normally issued by the manufacture of the capillary device 115, downloaded and installed in the gateway 113. The capillary device 115 pairs with the gateway 113 using the application software, and after a successful pairing, the capillary device 115 uploads a key such as e.g. K1 to the application software. Later on, also using the application software, the capillary device 115 may upload the data to the gateway 113.

The key enables the CMS 111 to identify the data collected from which capillary device 115.

Action 205 may be performed multiple times, e.g., continuously for a time period, while Actions 201-204 may only be performed once. Action 205 may actually be done either prior to or after Actions 201-204. For instance, the gateway 113 may collect the data from the capillary device 111 prior to creating the tunnel and the gateway 113 may decide when to send the collected data to the server 117 via the CMS 111.

Action 206

According to embodiments herein, the key to identify the capillary device 115 and the CMS 111 to manage the connectivity are provided.

The gateway 113 transmits the data to the server 117 via the CMS 111. The data is transmitted in the tunnel from the gateway (113) to the CMS (111), i.e., between the gateway 113 and the CMS 111. The tunnel is created according to a connectivity parameter associated to the key of the capillary device (115) stored in the CMS 111. As mentioned above the tunnel may be encrypted with the key obtained from the capillary device 115.

The collected data is transmitted in the tunnel between the gateway 113 and the CMS 111, instead of transmitting together with other traffic, it is therefore enabled to distinguish and handle the collected data in a different way from other traffic, e.g., audio, video, web browsing.

Security and privacy, particularly when the mobile gateway is roaming abroad, are guaranteed at a network level, thanks to the tunnel between the gateway 113 and the CMS 111, particularly when the tunnel is encrypted.

Thanks to the CMS 111, the connectivity between the server 117 and capillary device 115 is managed while assisting the data collection from the capillary device 115.

According to embodiments herein, the data collected from the capillary device 115 is encrypted data, which has been encrypted with the key by the capillary device 115. The encrypted data may be decrypted at the server 117. Whether or not to encrypt the data with the key is up to SP when manufacturing the capillary device.

An operating system of the gateway 113 may provide a user interface to let a user specify which mobile application is allowed to communicate when the gateway 113 is roaming; or this may be done programmatically by providing an API that the mobile application may invoke upon successfully paring the capillary device 115. Some embodiments herein enables the SP to pay to the owner of the CMS 111 either per device or a number of devices, to cover a cost of transmitting the collected data, the user of the capillary device 115 may therefore not pay. Particularly when the gateway 113 is roaming, the collected data towards the CMS 111 may be free of charge no matter where the mobile gateway 113 is located as long as the owner of the CMS 111 has an agreement with an operator running the wireless network 119.

Example of embodiments of a method performed by the CMS 111 for assisting the server 117 with collecting data from the capillary device 115 will now be described with reference to FIGS. 3a and 3b. The at least one connectivity management device is distributed globally in order to provide a local and quick access for device, e.g., the server 117 and the gateway 113.

The method may comprise the following actions, which actions may be taken in any suitable order. Actions that are optional are presented in dashed boxes in FIGS. 3a and 3b. Actions 301-307 are depicted in FIG. 3a and Actions 308-312 are depicted in FIG. 3b.

Action 301

In an example scenario, to validate the key the CMS 111 may assign the key for the capillary device 115.

The key may be assigned by the CMS 111 to the capillary device 115 upon a key request from the server 117. For example, the CMS 111 provides an interface to order the key and register the capillary device 115 thereon.

Action 302

The CMS 111 may further store a correspondence between the key and a serial number of the capillary device 115. A (key, serial_id) pair, i.e. the correspondence between the assigned key and a hardware serial number of the capillary device 115 may be stored in the CMS 111, and also on the server 117 and the capillary device 115.

The key request may order one key for one specific capillary device 115, the CMS 111 may directly store the correspondence between the key and a serial number of the capillary device 115. Alternatively, it can also be the case ordering a bulk of keys at once from the CMS 111, e.g., via an interface of the CMS; and then an SP registers capillary devices afterward through the same portal. As such, the CMS 111 may store the correspondence between the key and a serial number of the capillary device 115. The key request may also comprise a protocol and an identification of the server 117, e.g. a Uniform Resource Identifier (URI), an Internet Protocol (IP) address, a hostname of the server 117. Such that the CMS 111 will know using which protocol and to which server 117 the collected data will be forwarded. The CMS 111 may further store the protocol and the identification of the server 117 included in the key request.

Action 303

With respect to the connectivity parameter, according to some embodiments the CMS 111 may further assign the connectivity parameter for the capillary device 115.

Action 304

In some of these embodiments the CMS 111 further stores the correspondence between the connectivity parameter and the key of the capillary device 115.

Action 305

According to some embodiments, the method may further comprise validating the key before triggering the creation of the tunnel. Specifically, the CMS 111 may receive a validation request to validate the key from the gateway 113.

Action 306

According to some of these embodiments, the CMS 111 validates the key by identifying a correspondence between the key and a serial number of the capillary device.

Action 307

The CMS 111 may then send an Acknowledgement (ACK) to the gateway 113 when the correspondence between the key and the serial number of the capillary device 115 is identified. In case the correspondence between the key and the serial number of the capillary device 115 is not found, the CMS 111 sends (not shown) a Negative ACK (NACK) to the gateway 113.

As mentioned above, the validation request to validate the key may comprise a key, serial_id pair, where serial_id represents the serial number, and CMS 111 may implement the validation in different ways. For instance, using the serial number of the capillary device 115 as an index searching for the key corresponding to the serial number of the capillary device 115. Alternatively, using the key as an index to find the serial number.

In addition to the (key, serial_id) pair, when the validation request to validate the key may also comprise a device category of the capillary device 115, e.g. temperature sensor, smartwatch. Such that the CMS 111 may use the device category in combination with the serial_id to identify the capillary device 115 in case plural serial_ids are identical. This is helpful particularly in the case when the serial_id is the manufacture serial number, which is generated by the SP or the manufacturer, and the manufacture serial number is not guaranteed to be globally unique. In this case, the combination of the device category and the manufacturer serial number will be globally unique.

Action 308

The CMS 111 may further create the tunnel between the gateway 113 and the CMS 111. The CMS 111 instructs operator nodes in the wireless communication network 119 to create the tunnel according to the connectivity parameter associated to a key of the capillary device (115). Creating a tunnel is also referred to as establishing a tunnel.

According to embodiments herein, creating the tunnel between the gateway 113 and the CMS 111 according to the connectivity parameter comprises, searching for the connective parameter using the key, and establishing the tunnel according to the found connective parameter.

As said above, the tunnel is created per key, not per device, i.e. the tunnel is key specific. The capillary devices 115 having the same key in one capillary device group may use the same tunnel.

One possible implementation form is that Action 308 is only performed once, and then the tunnel may be maintained all the time for upcoming data transmission from one capillary device 115 or one capillary device group. However Action 308 is not necessarily performed every time when transmitting the data. Another possible implementation form is that Action 308 is performed for every data transmission session. In this case, the created tunnel may not be maintained all the time, but just when data transmission is needed. In this case, the CMS 111 may remove the tunnel per lifetime of a data transmission session.

Action 309

After the gateway 113 has collected the data from the capillary device 115, the gateway 113 forwards the data to the CMS 111. The CMS 111 thus receives the data from the gateway 113 via the tunnel which is from the gateway (113) to the CMS (111) The tunnel is created according to a connectivity parameter associated to a key of the capillary device (115) stored in the CMS (111). As discussed above, the tunnel may be encrypted with the key.

Thanks to the tunnel, particularly the encrypted tunnel, the security and privacy are guaranteed.

Action 309 may be performed plural of times, e.g., continuously for a time period, while Actions 305-308 may only be performed once.

Action 310

The CMS 111 then forwards the data to the server 117. The CMS 111 is provided for assisting the data collection from the capillary device 115.

According to some embodiments, based on the stored protocol and the identification of the server 117, the CMS 111 forwards the collected data to the server 117 corresponding to the identification using the protocol.

The CMS 111 may forward the data to the server 117 according to a conventional secured way, e.g. by using an encrypted tunnel or Hypertext Transfer Protocol Secure (HTTPS) or Internet Protocol Security (IPsec).

According to some embodiments, when the CMS 111 has multiple connectivity management devices, the above Actions 301-310 may be performed by different connectivity management devices. For instance, Actions 301-304, 310 are performed by a connectivity management device closest to the server 117, e.g. 111-3. Actions 305-309 are performed by a connectivity management device closest to the gateway 113, e.g. 111-1. In this case, the connectivity management device, e.g. 111-1, of the CMS 111 further shares, Action 311, the correspondence between the key and a serial number of the capillary device 115, the correspondence between the connectivity parameter and the key of the capillary device (115), and the data collected from the capillary device 115, with other connectivity management devices, e.g., 111-2, 111-3, in the CMS 111. The other connectivity management devices, e.g. 111-2, 111-3, store the shared information in the memory 590 thereof. Meanwhile the connectivity management device, e.g. 111-1, further stores, Action 312, the above information shared by other connectivity management devices, e.g. 111-2, 111-3, of the CMS 111 in the memory 590 thereof. A local or the nearest connectivity management device with respect to the server 117, e.g. 111-3, forwards the data to the server 117. By doing this, low latency is achieved to forward the data to the server 117, owing to that the multiple connectivity management devices 111-1, 111-2, 111-3, are distributed globally. Though the information sharing between the connectivity management devices may cause latency, because the connectivity management devices are normally located in the CN, the latency is considerably much lower. Another advantage is that by having multiple connectivity management devices the CMS 111 solves the distribution, and the SP may only have one server 117, SP does not need to distribute its servers 117 globally. The server 117 only needs to communicate to a local connectivity management system instance.

Figure 4A:
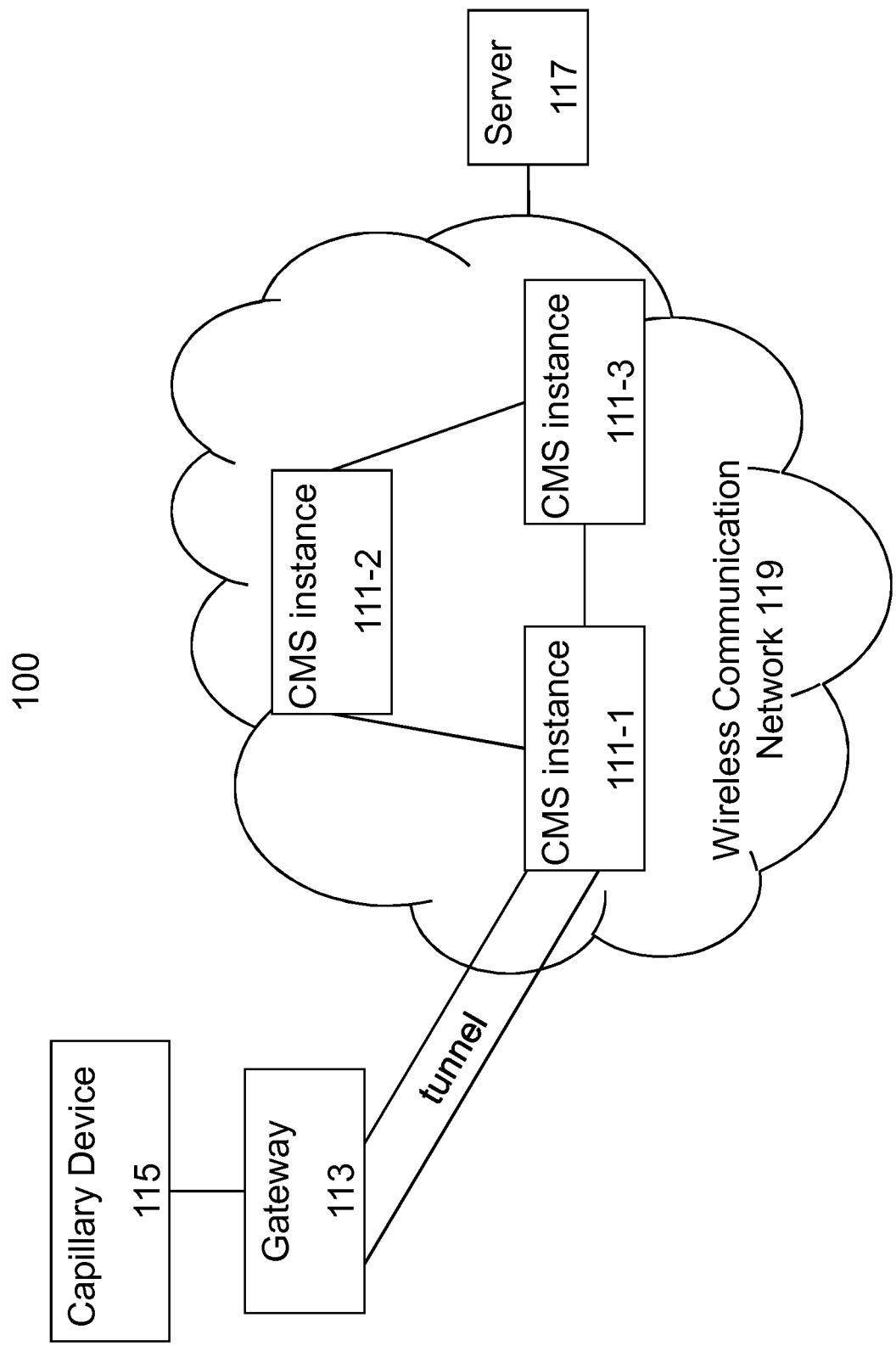
FIG. 4a-4c are schematic block diagrams illustrating embodiments of a communication network.

FIG. 4a depicts an embodiment of the communications network 100 in which embodiments herein may be implemented. A difference, comparing to FIG. 1, lies on that the CMS 111 comprises multiple CMS instances, which are also referred to as connectivity management devices, 111-1, 111-2, and 111-3, e.g. distributed globally to provide a cloud service. The gateway 113 communicates with the CMS connectivity management device 111-1. As an example the connectivity management devices 111-1, 111-2, and 111-3 may be located in different regions of the wireless communication network 119. In this case, each connectivity management device of the CMS 111 further shares connectivity management information and data collected from the capillary device 115, with other connectivity management devices in the CMS 111. By doing this, a connectivity parameter may also be globally enforced.

When transmitting data, the CMS 111 acts as a transparent proxy from the gateway 113 to the server 117, and communication between the CMS 111 and the gateway 113 is done through the established tunnel. The server 117 does not need to care about whom their capillary devices 115 should communicate with because the capillary devices 115 only need to communicate with a local connectivity management device via the gateway 113 and the data collected from all capillary devices 115 globally will be routed eventually by the local connectivity management device.

Figure 4B:
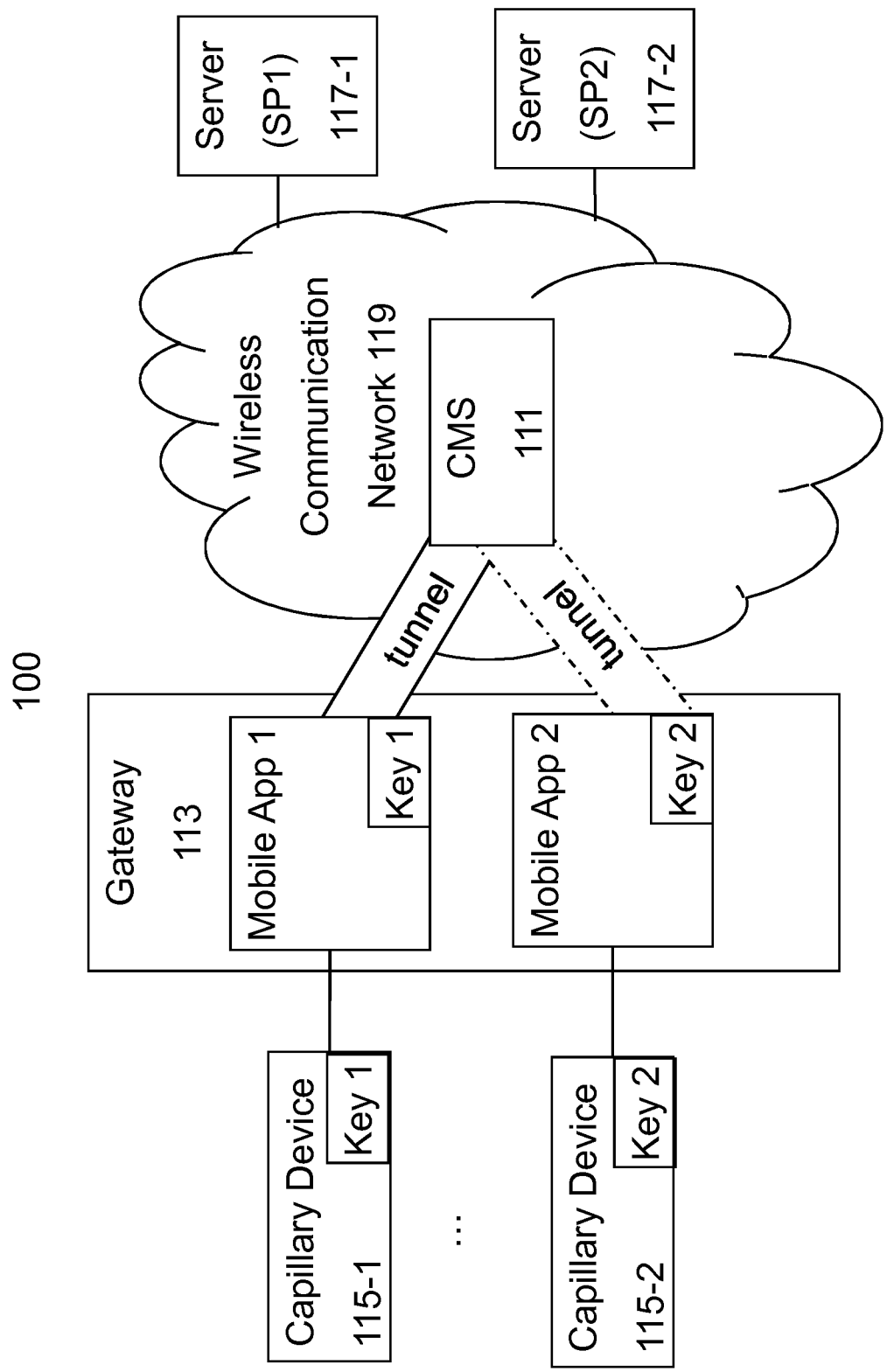

FIG. 4b depicts a detailed example of the communications network 100 in which embodiments herein may be implemented. In FIG. 4b, multiple capillary devices, e.g. 115-1 and 115-2, are shown. This embodiment may be combined with any other embodiments. Each capillary device 115-1 or 115-2 is identified by the CSM 111 as having its own key. Accordingly, the data collected from the capillary device 115 is also identified by the key. The capillary device 115-1 has key 1, and the capillary device 115-2 has key 2. The capillary device 115-1 communicates with the mobile gateway 113 using a mobile application, Mobile App 1. The capillary device 115-2 communicates with the mobile gateway 113 using a mobile application, Mobile App 2. Assume the capillary device 115-1 is associated to a server 117-1 belonging to SP1, and the capillary device 115-2 is associated to a server 117-2 belonging to SP2. The CMS 111 configures the connectivity between each capillary device 115-1, 115-2 and its associated server 117-1, 117-2, respectively, into the wireless communication network 119. Additionally, different connectivity parameters, e.g. different QoS, shown as different lines in the figure, are also configured by the CMS 111.

Figure 4C:
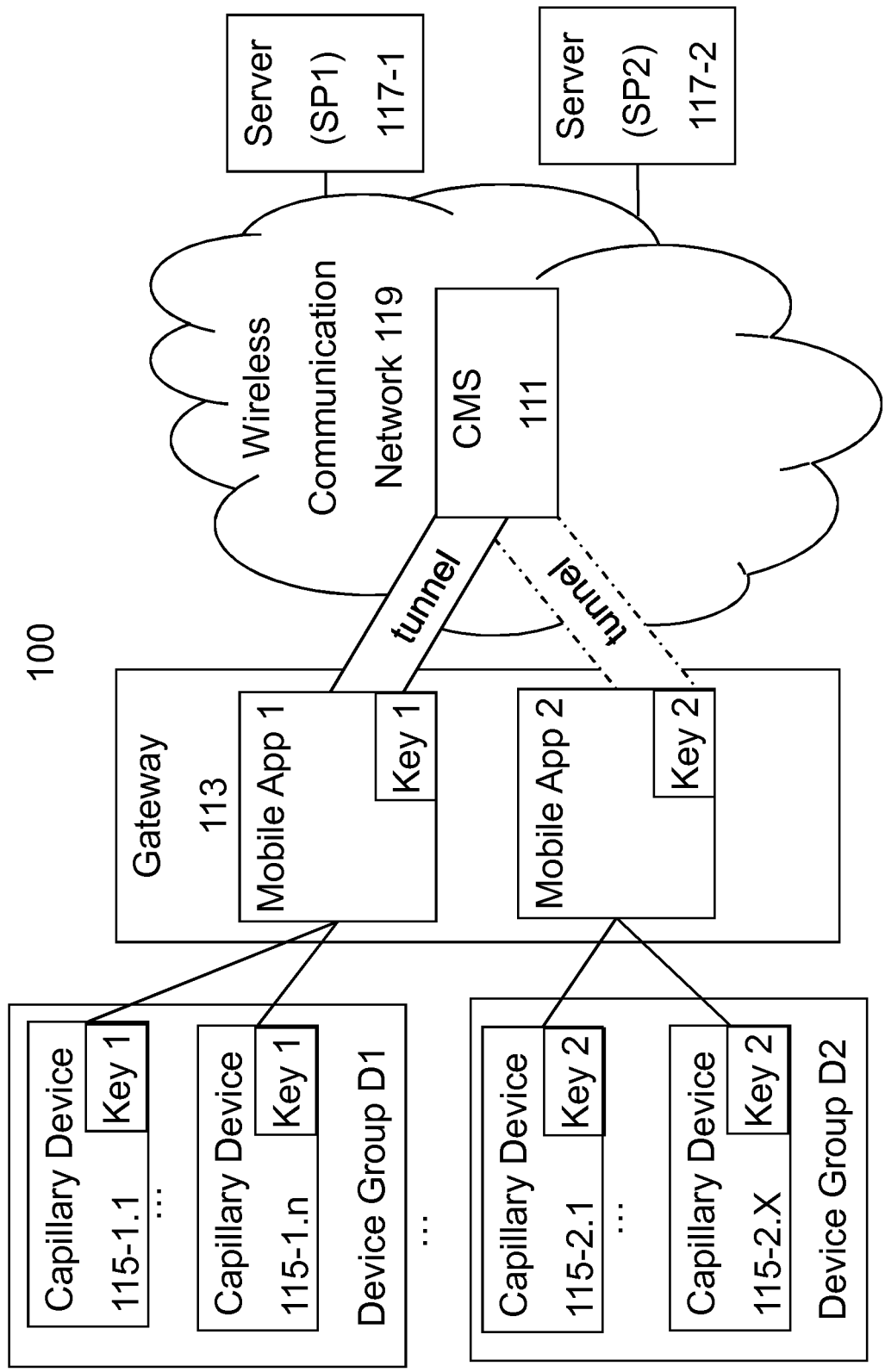

FIG. 4c depicts more detailed example of the communications network 100 in which embodiments herein may be implemented. Multiple device groups are shown in FIG. 4c, where the capillary devices 115-1.1, 115-1.n form a device group D1, the capillary devices 115-2.1, 115-1.x form a device group D2, where n and x are natural numbers (integers). It means one key may be associated with either one capillary device 115 or a plurality of capillary devices 115. An SP orders a key for the capillary device 115, or a number of keys for a device group from the CMS 111. The SP then uploads one key to each capillary device 115. The SP later on sells a capillary device 115 to a user. The SP stores a (key, serial_id) pair on the server 117, so does the CMS 111.

Note that there may not necessarily be one-to-one mapping between the capillary device group and server 117, but it may be many-to-many mapping between the capillary device group and server 117. For instance, multiple capillary device groups may be associated to the same server 117 or multiple servers 117 may be associated to one capillary device group. The CMS 111 may forward the collected data from one capillary device group to multiple servers 117 in case multiple servers 117 are associated to one capillary device group.

In FIG. 4b and FIG. 4c, one mobile application is shown for each capillary device group, D1 and D2, however in a real implementation, there may also be only one mobile application with multiple separate threads, one thread enables the communication between one capillary device or capillary device group and its corresponding server 117.

Figure 5:
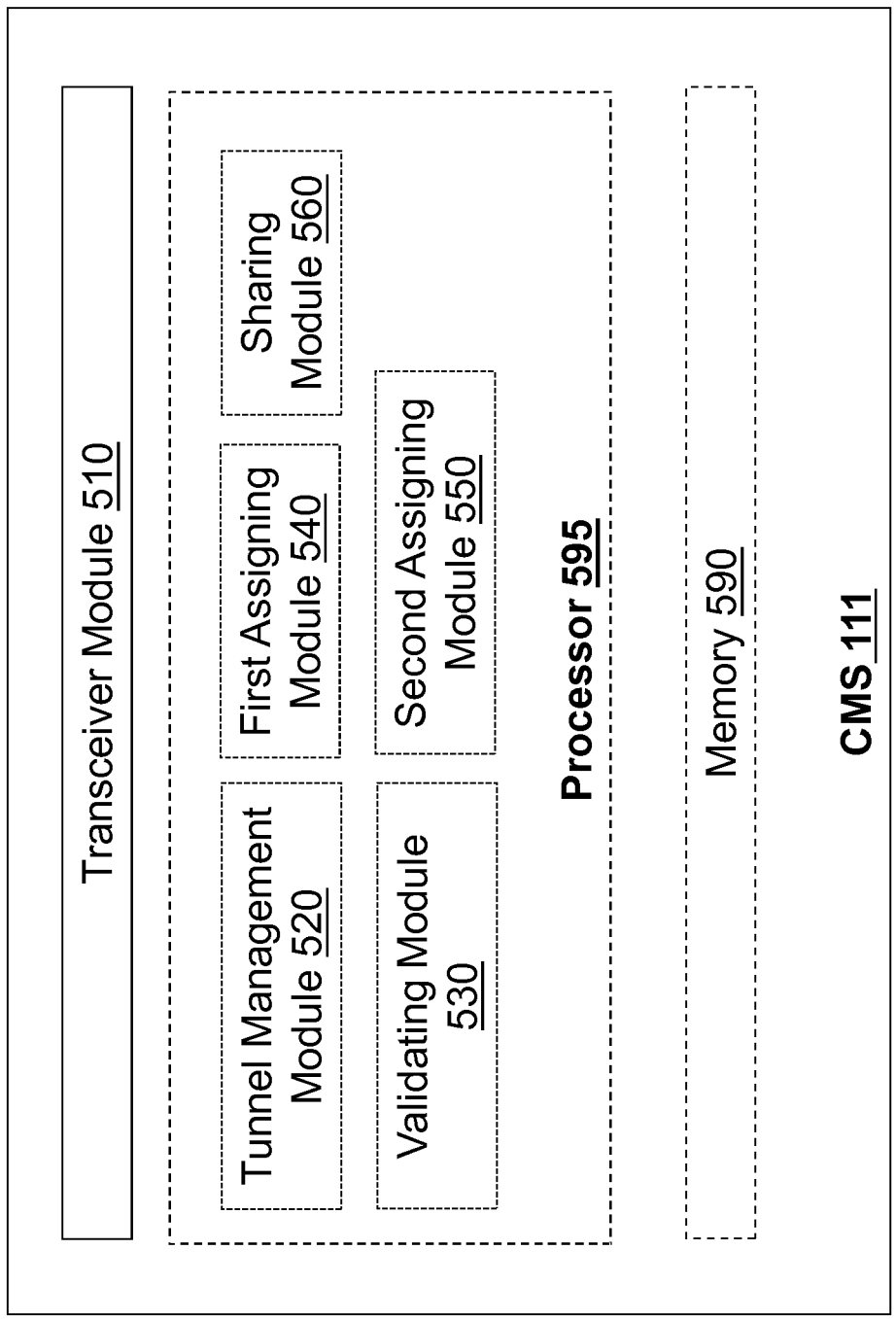
FIG. 5 is a schematic block diagram illustrating embodiments of a CMS.

To perform the method actions for assisting a server 117 with collecting the data from a capillary device 115, the CMS 111 may comprise the following arrangement depicted in FIG. 5. The CMS 111 has at least one connectivity management device that is distributed globally in order to provide a local and quick access for other device, e.g., the server 117 and the gateway 113. The connectivity management device may also be referred to as a connectivity management instance.

The CMS 111 is configured, e.g. by means of a transceiver module 510, to receive the data from a gateway 113 via a tunnel which is from the gateway 113 to the CMS 111, wherein the tunnel is created according to a connectivity parameter associated to a key of the capillary device 115 and stored in the CMS 111. The tunnel may be encrypted with a key related to the capillary device 115.

The CMS 111 is also configured, e.g. by means of the transceiver module 510, to forward the data to the server 117.

The CMS 111 may be further configured, e.g. by means of a tunnel management module 520, to create, according to the connectivity parameter associated to a key of the capillary device 115 and stored in the CMS 111, the tunnel between the gateway 113 and the CMS 111. The CMS 111 may be further configured, e.g. by means of the tunnel management module 520, to remove the tunnel per lifetime of a data transmission session.

The CMS 111 may be further configured, e.g. by means of the transceiver module 510, to receive the request to validate the key from the gateway 113.

The CMS 111 may be further configured, e.g. by means of a validating module 530, to validate the key by identifying a correspondence between the key and a serial number of the capillary device;

The CMS 111 may be further configured, e.g. by means of the transceiver module 510, to send the Ack to the gateway 113 when the correspondence between the key and the serial number of the capillary device is identified.

The CMS 111 may be further configured, e.g. by means of a first assigning module 540, to assign the key for the capillary device 115; and e.g. by a memory 590, to store the correspondence between the key and a serial number of the capillary device 115.

The CMS 111 may be further configured, e.g. by means of a second assigning module 550, to assign the connectivity parameter for the capillary device 115; and e.g. by the memory 590, to store the correspondence between the connectivity parameter and the key of the capillary device 115. The memory 590 may comprise one or more memory units to store the correspondence between the key and a serial number of the capillary device 115, and the correspondence between the connectivity parameter and the key of the capillary device 115, respectively.

According to some embodiments, when the CMS 111 comprises multiple connectivity management devices (not shown in FIG. 5), the above modules 510-590 may be comprised in different connectivity management devices. For instance, the modules 510-530 are part of a connectivity management device close to the gateway 113. The modules 540-550, 590, are part of a connectivity management device close to the server 117. In this case, each connectivity management device in the CMS 111 is further configured, e.g. by means of a sharing module 560, to share the correspondence between the key and a serial number of the capillary device 115, the correspondence between the connectivity parameter and the key of the capillary device 115, and the data collected from the capillary device 115, with other connectivity management devices in the CMS 111. The connectivity management device receiving the shared information is further configured to store it in the memory 590 thereof. A local or the nearest connectivity management device with respect to the server 117 forwards the data to the server 117. By doing this, low latency is achieved to forward the data to the server 117.

Figure 3A:
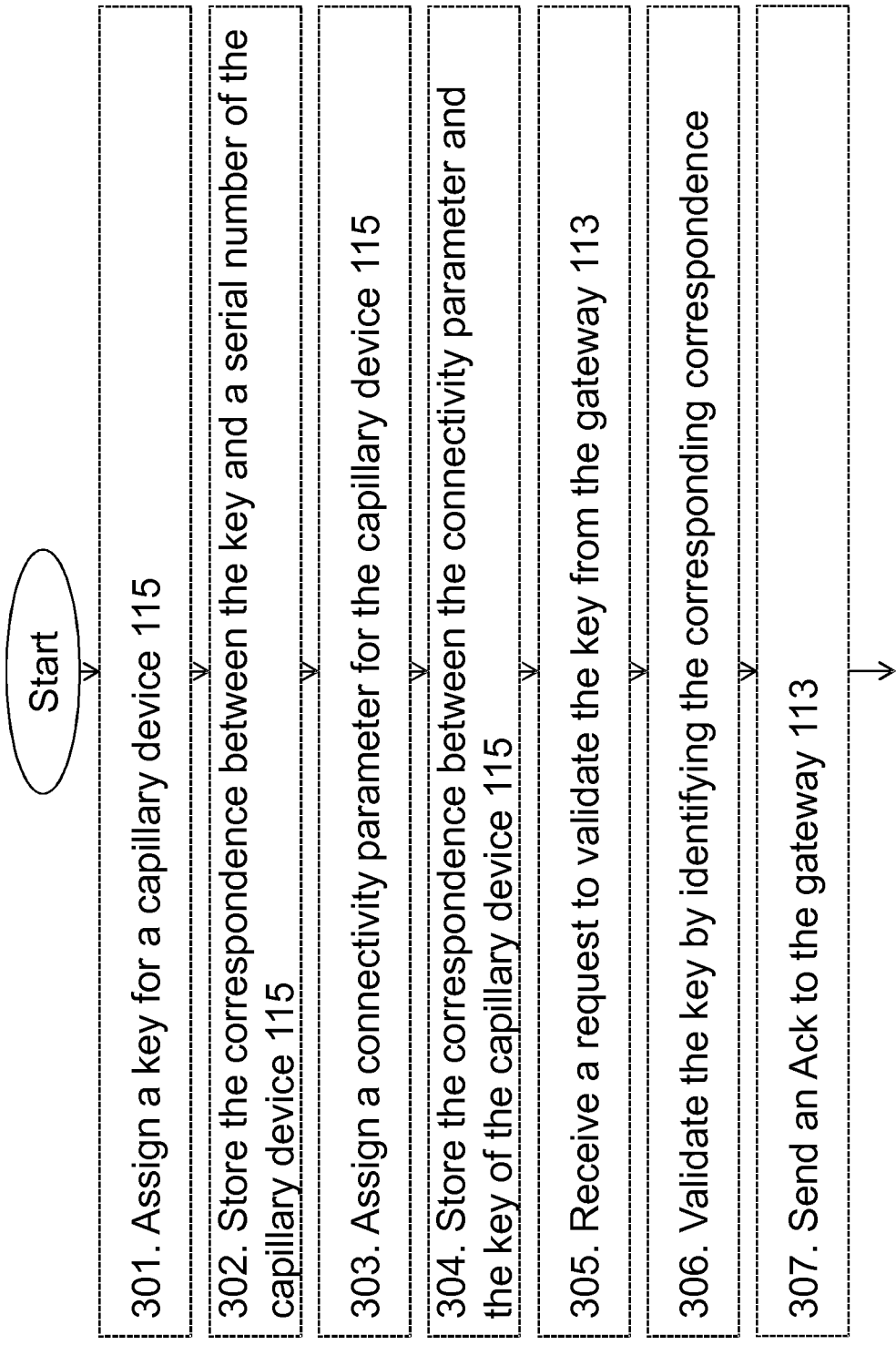
FIGS. 3a-3b are flowcharts depicting embodiments of methods in a CMS.
Figure 3B:
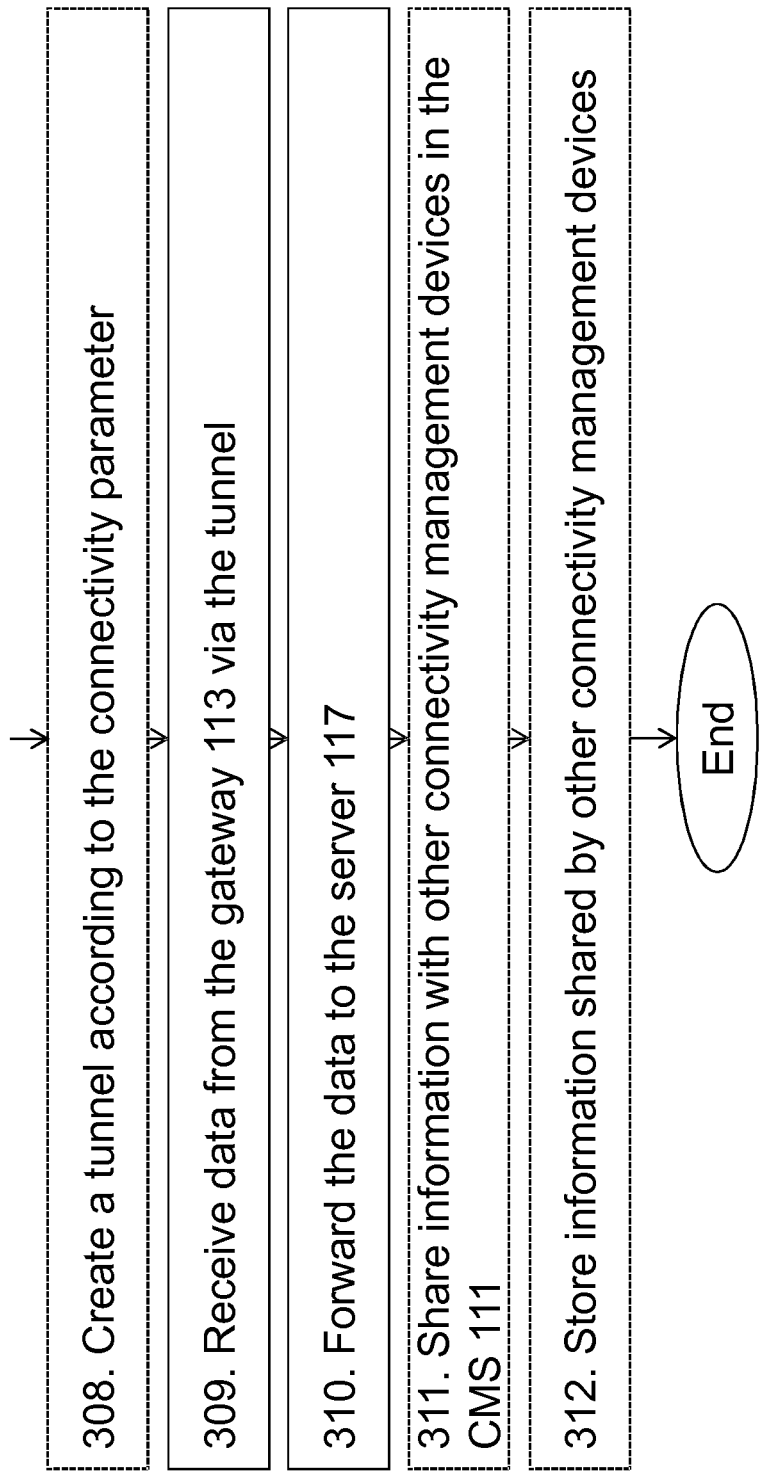

In some embodiments, a computer program comprises instructions, which when executed by the at least one processor 595, cause the at least one processor 595 to perform actions according to any of the Actions according to the embodiments shown in FIGS. 3*a*-3*b*.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

In some embodiments, the process for assisting the server 117 with collecting data from the capillary device 115, may be implemented through one or more processors, such as processor 595 in the CMS 111 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the CMS 111. One such carrier may be in the form of a CD ROM disc. It is however feasible with other data carriers such as a memory stick. The computer program code may furthermore be provided as pure program code on a server and downloaded to the CMS 111.

The CMS 111 may further comprise the above transceiver module 510 in addition with a memory comprising one or more memory units, such as the memory 590 in FIG. 5. The memory 590 comprises instructions executable by the respective processor.

The memory 590 is arranged to be used to store e.g. data, configurations, and applications to perform the methods herein when being executed in the CMS 111.

Those skilled in the art will also appreciate that the modules in the CMS 111, described above may refer to a combination of analog and digital circuits, and/or one or more processors configured with software and/or firmware, e.g. stored in the respective memory 590, that when executed by the one or more processors such as the processor 595 as described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

Figure 6:
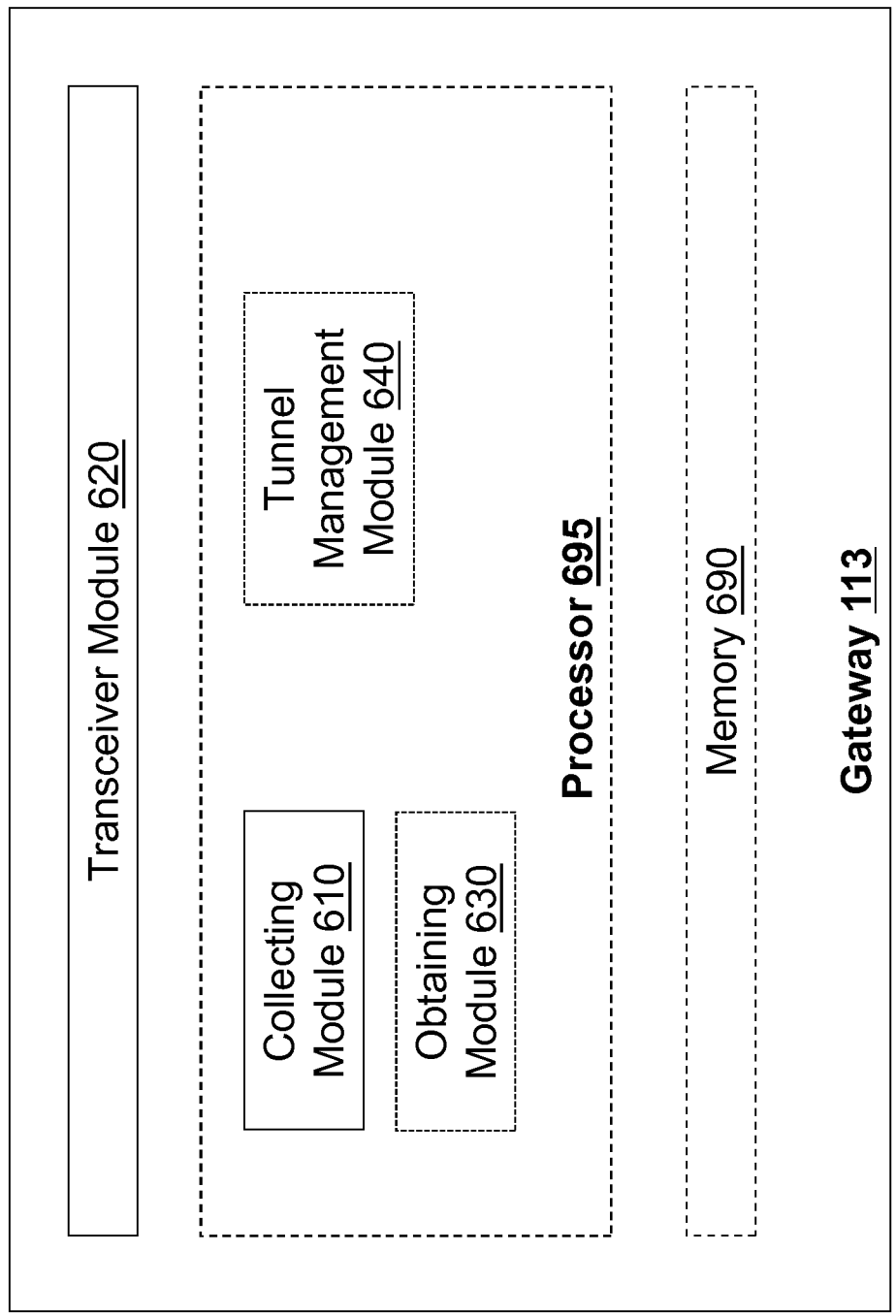
FIG. 6 is a schematic block diagram illustrating embodiments of a gateway.

To perform the method actions for assisting the server 117 with collecting the data from the capillary device 115, the gateway 113 may comprise the following arrangement depicted in FIG. 6.

The gateway 113 is configured, e.g. by means of a collecting module 610, to collect the data from the capillary device 115.

The gateway 113 is also configured, e.g. by means of a transceiver module 620, to transmit the data to the server 117 via the CMS, 111. The data is transmitted in a tunnel from the gateway (113) to the CMS (111). The tunnel is created according to a connectivity parameter associated to the key of the capillary device (115) and stored in the CMS 111.

The gateway 113 may be configured, e.g. by means of an obtaining module 630, to obtain the key from the capillary device 115, and, e.g. by means of a tunnel management module 640, to trigger to create, according to the connectivity parameter associated to a key of the capillary device 115 and stored in the CMS 111, the tunnel. The gateway 113 may further be configured, e.g. by means of the tunnel management module 640 to trigger to remove the created tunnel after a data transmission session.

The gateway 113 may be configured, e.g. by means of the transceiver module 610, to send, a request to the CMS 111 to validate the key; and e.g. by means of the transceiver 610, to receive, an acknowledgement from the CMS 111 when the key is validated.

Figure 2:
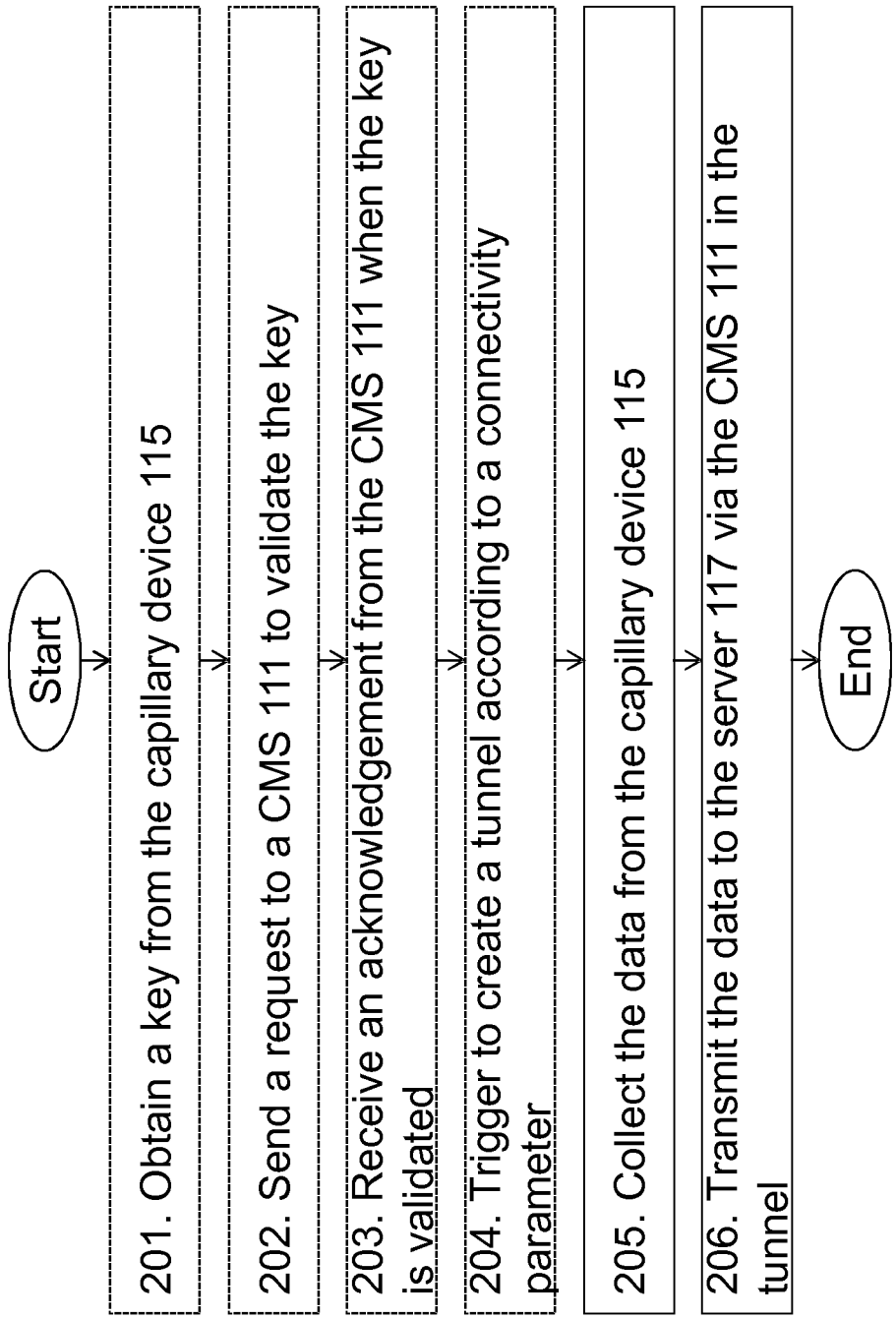
FIG. 2 is a flowchart depicting embodiments of a method in a gateway.

In some embodiments, a computer program comprises instructions, which when executed by the at least one processor 695, cause the at least one processor 695 to perform actions according to any of the Actions according to the embodiments shown in FIG. 2.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

In some embodiments, the process for assisting the server 117 with collecting data from the capillary device 115, may be implemented through one or more processors, such as processor 695 in the gateway 113 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the gateway 113. One such carrier may be in the form of a CD ROM disc. It is however feasible with other data carriers such as a memory stick. The computer program code may furthermore be provided as pure program code on a server and downloaded to the gateway 113.

The gateway 113 may further comprise the above transceiver module 620, and the memory comprising one or more memory units, such as a memory 690 in FIG. 6. The memory 690 comprises instructions executable by the respective processor.

The memory 690 is arranged to be used to store, e.g. data, configurations, and applications to perform the methods herein when being executed in the gateway 113.

Those skilled in the art will also appreciate that the modules in the gateway 113, described above may refer to a combination of analog and digital circuits, and/or one or more processors configured with software and/or firmware, e.g. stored in the respective memory 695, that when executed by the one or more processors such as the processor 695 as described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

According to another embodiment, a system for assisting the server 117 with collecting data from the capillary device 115 is provided. The system comprises the gateway 113 according to any one of the above embodiments.

According to some embodiment, the system may further comprise the CMS 111 according to any one of the above embodiments.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a gateway for assisting a server with collecting data from a capillary device, the method comprising:
   collecting the data from the capillary device; and
   transmitting the data to the server via a Connectivity Management System (CMS), wherein
   the data is transmitted in a tunnel from the gateway to the CMS, and
   the tunnel is created according to a connectivity parameter associated to a key of the capillary device and stored in the CMS.

2. The method of claim 1, wherein
   the capillary device comprises a sensor, and
   the data collected from the capillary device is: i) data that was generated by the sensor or ii) data generated by the capillary device based on data generated by the sensor.

3. The method of claim 1, wherein at least one of the following has been encrypted with the key: the data collected from the capillary device, and the tunnel.

4. The method of claim 1, further comprising:
   obtaining the key from the capillary device; and
   after obtaining the key, triggering the creation of the tunnel.

5. The method of claim 4, further comprising:
   prior to triggering the creation of the tunnel and after obtaining the key from the capillary device, transmitting to the CMS a request message comprising the key; and
   after transmitting the request message, receiving a response message transmitted by the CMS in response to the request message, wherein the response message indicates whether or not the key is valid, wherein
   the gateway triggers the creation of the tunnel in response to determining that the response message indicates that the key is valid.

6. The method of claim 4, further comprising:
   after obtaining the key and before triggering the creation of the tunnel, determining that the key is valid, wherein
   the gateway triggers the creation of the tunnel in response to determining that the key is valid.

7. The method of claim 1, wherein
   the connectivity parameter comprises a Quality of Service parameter and/or the connectivity parameter further comprises a firewall rule, a whitelist and/or a blacklist.

8. The method of claim 7, wherein
   the key is generated based on any one of: an Integrated Circuit Card Identifier, an International Mobile Subscriber Identity, or an International Mobile Equipment Identity.

9. A gateway for assisting a server with collecting data from a capillary device, the gateway being configured to:
   collect the data from the capillary device; and
   transmit the data to the server via a Connectivity Management System (CMS), wherein the data is transmitted in a tunnel from the gateway to the CMS, wherein the tunnel is created according to a connectivity parameter associated to a key of the capillary device and stored in the CMS.

10. The gateway of claim 9, further being configured to:
obtain the key from the capillary device;
trigger to create, according to the connectivity parameter stored in the CMS, the tunnel with respect to the key.

11. The gateway of claim 9, further being configured to:
send, a request to the CMS to validate the key; and
receive, an acknowledgement from the CMS when the key is validated, wherein
the key is generated based on any one of: an Integrated Circuit Card Identifier, an International Mobile Subscriber Identity, or an International Mobile Equipment Identity, and
the connectivity parameter is adapted to comprise a Quality of Service parameter and/or the connectivity parameter further comprises a firewall rule, a whitelist and/or a blacklist.

12. The gateway of claim 9, wherein the data collected from the capillary device has been encrypted with the key.

13. A computer program product comprising a non-transitory computer readable medium storing a computer program comprising instructions, which when executed by processing circuitry of a gateway, cause the gateway to perform a method comprising:
collecting data from a capillary device; and
transmitting the data to a server via a Connectivity Management System (CMS), wherein
the data is transmitted in a tunnel from the gateway to the CMS, and
the tunnel is created according to a connectivity parameter associated to a key of the capillary device and stored in the CMS.

14. A method performed in a Connectivity Management System (CMS) having at least one connectivity management device, for assisting a server with collecting data from a capillary device, the method comprising:
receiving the data from a gateway via a tunnel which is from the gateway to the CMS, wherein the tunnel is created according to a connectivity parameter associated to a key of the capillary device and stored in the CMS; and
forwarding the data to the server.

15. The method of claim 14, further comprising:
creating, according to the connectivity parameter, the tunnel with respect to the key.

16. The method of claim 14, further comprising:
receiving a request to validate the key from the gateway;
validating the key by identifying a correspondence between the key and a serial number of the capillary device; and
sending an Acknowledgement, Ack, to the gateway when the correspondence between the key and the serial number of the capillary device is identified.

17. The method of claim 14, further comprising:
assigning the key for the capillary device and/or assigning the connectivity parameter for the capillary device; and
storing the correspondence between the key and a serial number of the capillary device and/or storing the correspondence between the connectivity parameter and the key of the capillary device.

18. The method of claim 14, wherein
the connectivity parameter comprises a Quality of Service parameter and/or the connectivity parameter comprises a firewall rule, a whitelist and/or a blacklist, and
the key is generated based on any one of: an Integrated Circuit Card Identifier, an International Mobile Subscriber Identity, and an International Mobile Equipment Identity.

19. A Connectivity Management System (CMS) having at least one connectivity management device, for assisting a server with collecting data from a capillary device, the CMS being configured to:
receive the data from a gateway via a tunnel which is from the gateway to the CMS, wherein the tunnel is created according to a connectivity parameter associated to a key of the capillary device and stored in the CMS; and
forward the data to the server.

20. The CMS of claim 19, further being configured to:
create, according to the connectivity parameter, the tunnel with respect to the key.

21. The CMS of claim 19, further being configured to:
receive a request to validate the key from the gateway;
validate the key by identifying a correspondence between the key and a serial number of the capillary device; and
send an Acknowledgement, Ack, to the gateway when the correspondence between the key and the serial number of the capillary device is identified.

22. The CMS of claim 19, further being configured to:
assign the key for the capillary device and/or assign the connectivity parameter for the capillary device; and
store the correspondence between the key and a serial number of the capillary device and/or store the correspondence between the connectivity parameter and the key of the capillary device.

23. The CMS of claim 19, wherein
the connectivity parameter is adapted to comprise a Quality of Service parameter and/or the connectivity parameter comprises a firewall rule, a whitelist and/or a blacklist, and
the key is generated based on any one of: an Integrated Circuit Card Identifier, an International Mobile Subscriber Identity, and an International Mobile Equipment Identity.

24. A computer program comprising instructions, which when executed by processing circuitry of a Connectivity Management System (CMS), cause the CMS to perform a method comprising:
receiving data provided by a capillary device, wherein the data is received from a gateway via a tunnel which is from the gateway to the CMS, wherein the tunnel is created according to a connectivity parameter associated to a key of the capillary device and stored in the CMS; and
forwarding the data to the server.

* * * * *